US006293666B1

(12) United States Patent
Mou et al.

(10) Patent No.: US 6,293,666 B1
(45) Date of Patent: Sep. 25, 2001

(54) INK-JET CARTRIDGE WITH PRESSURE ADJUSTMENT DEVICE

(75) Inventors: Tse-Chi Mou; Fu-San Lin; Jing-Yuan Ho; Chin-Yi Chou, all of Hsin-Chu (TW)

(73) Assignee: Microjet Technology Co., Ltd., Hsin-Chu (TW)

( * ) Notice: Subject to any disclaimer, the term of this patent is extended or adjusted under 35 U.S.C. 154(b) by 0 days.

(21) Appl. No.: 09/425,245

(22) Filed: Oct. 25, 1999

(30) Foreign Application Priority Data

Aug. 11, 1999 (TW) ............................................ 88213601

(51) Int. Cl.[7] ............................ B41J 2/175; G01D 15/18

(52) U.S. Cl. ........................ 347/87; 222/105; 222/386.5

(58) Field of Search .................................. 347/87, 86, 7; 222/105, 386.5

(56) References Cited

U.S. PATENT DOCUMENTS 3,414,165 * 12/1968 Goodenow ............................ 222/82
5,409,134 * 4/1995 Cowger et al. ................... 347/87 X
5,731,824 * 3/1998 Kneezel et al. ......................... 347/7
6,003,966 * 12/1999 Ahn ........................................ 347/7

FOREIGN PATENT DOCUMENTS 0 519 452 A2 * 12/1992 (EP) ...................................... 347/86

* cited by examiner

*Primary Examiner*—David F. Yockey
(74) *Attorney, Agent, or Firm*—Bacon & Thomas

(57) ABSTRACT

A pressure adjustment device in an ink cartridge employs an elastic air bag in communication with the atmosphere through a ventilation hole in a connection body which is installed in a top wall of the cartridge housing. Response to pressure changes is increased by a spring connected between a bottom end of the air bag and a bottom wall of the cartridge housing which applies a pulling force to the bottom end of the air bag.

2 Claims, 5 Drawing Sheets

INK-JET CARTRIDGE WITH PRESSURE ADJUSTMENT DEVICE

FIELD OF THE INVENTION

This present invention relates to a pressure-adjustment means, and especially to a pressure-adjusting means for adjusting the pressure in the ink chamber inside an ink-jet cartridge.

DESCRIPTION OF THE PRIOR ART

In this modern era of massive information and ubiquitous presence of computers, not only is the use of computers in heavy demand, but the quality and speed of computers also need to meet stringent expectation. This demand for performance also extends to the computer peripherals. As a result, not only do novel peripherals emerge daily, but their performances also improve constantly. Of all the peripherals, the most common one is probably the printer, which has become almost an indispensable part of any computer system.

The currently available printers in the market can be classified into three types based on their methods of printing: dot-matrix, ink-jet and laser printers. Although dot-matrix printers are lower priced, as their printing speed and printing quality are both inferior, they have been unable to compete against ink-jet or laser printers in the market and are relegated to specific tasks only. In the current market are predominantly ink-jet and laser printers, and each of which has its strengths and weaknesses when compared to the other. Ink-jet printers cost less, while laser printers possess superior printing quality. Although ink-jet printers are more attractively priced, however, their inferior printing quality and speed make them less competitive when more sophisticated printing is being demanded. Generally speaking, as ink-jet printers use a liquid (i.e., ink) as its printing medium, the physical properties of liquids can adversely affect the printing quality. For instance, negative effects can arise from the flexibility of ink, turbulence, air-bubbles in the ink and uncontrollable ink flow direction due to smaller viscosity coefficient, etc. Included in the design of ink-jet printing is a means for controlling the release of ink droplets from the ink chamber to the medium surface. As described in the prior art, ink-jet printing is accomplished by the use of a printhead, attached to the ink-jet cartridge, which releases ink in spurts in response to control signals.

Printheads generally employ either of two methods to release ink spurts: by means of thermal bubbles or by piezoelectricity. In the thermal bubbles method, a thermal film resistor in the printhead heats up a small portion of the ink to almost boiling temperature and the gaseous ink (i.e., the ink droplets) is then released through the orifices. In the piezoelectricity method, a piezoelectric element in the printhead responds to the control signals and generates pressure waves by compressing the ink that forces the ink to gush through the orifices.

Although the two prior art ink-jet printing methods can effectively release ink from the ink chamber in droplets, they are ineffective in preventing ink leakage when the printer is in its idle state. Therefore, the conventional design is in need of a technique that can prevent ink leakage during the idle state. This may be achieved by creating within the ink chamber certain slight "back pressure." This back pressure refers to pressure in the condition of a partial vacuum within the ink chamber or pressure in the chamber being less than atmospheric pressure, for the purpose of preventing free flow of ink through the printhead. Additionally, back pressure increase refers to increasing the pressure difference between the pressure inside the ink chamber and the atmospheric pressure.

The back pressure in the ink-jet cartridge must be able to prevent ink leakage at all times, while it can not be so great as to prevent the ability to release the ink droplets. Furthermore, the design of the ink-jet cartridge must be such that the cartridge remains operative under any condition. Specifically, when the printhead is idle, the ink should be held inside, and when the printing is in progress, spraying of ink should be unhindered. When ink level drops low because of consumption, from the ideal gas law, the increased space volume should lead to decreased back pressure in the ink chamber. And if the back pressure mentioned previously is not adjusted accordingly, the printhead would be unable to overcome the increased back pressure and incapable of releasing the ink droplets in spurts.

The U.S. Pat. No. 5,409,134 discloses a pressure-adjustment means which comprises certain air-bag and elastic springs that can respond to changes in back pressure inside the ink chamber. This air-bag can move between the smallest ink volume setting and the biggest ink volume. It can adjust the volume of air inside the ink chamber to compensate for the changes in the ink volume, so that the back pressure inside the ink chamber can be maintained within a pre-determined range such that ink would not leak when in an idle state and can spurt outwards of the printhead when heated.

For instance, when the air pressure in the surrounding decreases so that the difference between the atmospheric pressure and the back pressure is reduced, the pressure-adjustment means will activate to increase the back pressure for holding in the ink by increasing the volume of the ink chamber.

The pressure-adjustment means disclosed by said U.S. patent is shown in FIGS. 1 and 2, and comprises a pair of elastic springs 6 and an inelastic but inflatable air-bag 20 attached thereon. The springs 6 and the air-bag 20 are installed inside the ink chamber 3 of the ink-jet cartridge, wherein the air inside the air-bag can ventilate with the air outside of the ink-jet cartridge as show in FIG. 1. The springs 6 work with the air-bag 20 and enable the air-bag 20 to inflate or deflate in response to the changes in pressure. Such inflation/deflation takes place when the pressure inside the ink chamber 3 changes as well as when the pressure outside of the ink chamber 3 changes.

In reference to FIG. 2, the inflation of air-bag 20 will push against the springs 6 which in turn react with an elastic force that pushes back on the air-bag, so that the elastic springs 6 and air-bag 20 remain engaged in a state of equilibrium. The inflation/deflation of the air-bag adjusts the volume inside the ink chamber 3, and thereby constrains the back pressure inside the ink chamber 3 within the normal operative range, so that the ink-jet cartridge remains operative in spite of changes in the external air pressure or consumption of the ink.

However, in employing the pressure-adjustment means comprised of the combination of elastic springs 6 and the attached air-bag, in order to produce the desired result, the elastic constant of the elastic springs 6 and the inflation/deflation capability of the air-bag 20 must both be precisely controlled in the manufacturing process. In case of weak engagement between the elastic springs 6 and the air-bag 20 so that a slack therebetween arises, the sensitivity to detect the changes in the pressure would then be reduced. As there is a stringent demand on the exact physical properties of the elastic springs 6 and the air-bag 20 in the manufacturing process, the product acceptance rates are thus lowered. In view of such, the present invention provides a method, which is superior to the prior art in having more effective quality control during the manufacturing process and having higher product acceptance rates, which are achieved by reducing the number of elements involved that simplifies the structure. The present invention thus has practical implication for the industry.

SUMMARY OF THE INVENTION

The primary object of the present invention is to provide a single element elastic air-bag for adjusting the back pressure inside the ink chamber.

In view of the requirement in achieving exactness in handling the physical properties of the constituents, which effectively lowers the product acceptance rates, the present invention proposes to use fewer constituent elements or superior pressure-adjustment means to make an improvement. The pressure-adjustment means of the present invention refers to an elastic air-bag installed within the ink-jet cartridge, wherein the air inside the air-bag is in circulation with the air outside the ink-jet cartridge. When the pressure difference between the air pressure inside the air-bag and the back pressure in the ink chamber undergoes changes, the elastic air-bag automatically inflates or deflates itself by virtue of its own elasticity, so as to change the volume inside the ink chamber that maintains the back pressure to within a certain range. This then prevents any ink leakage during idle state, and at same time, enables smooth releasing of ink droplets by the printhead during printing.

BRIEF DESCRIPTION OF THE DRAWINGS

The following drawings can further illustrate the characteristics of the present invention.

DETAILED DESCRIPTION OF THE INVENTION

Figure 1:
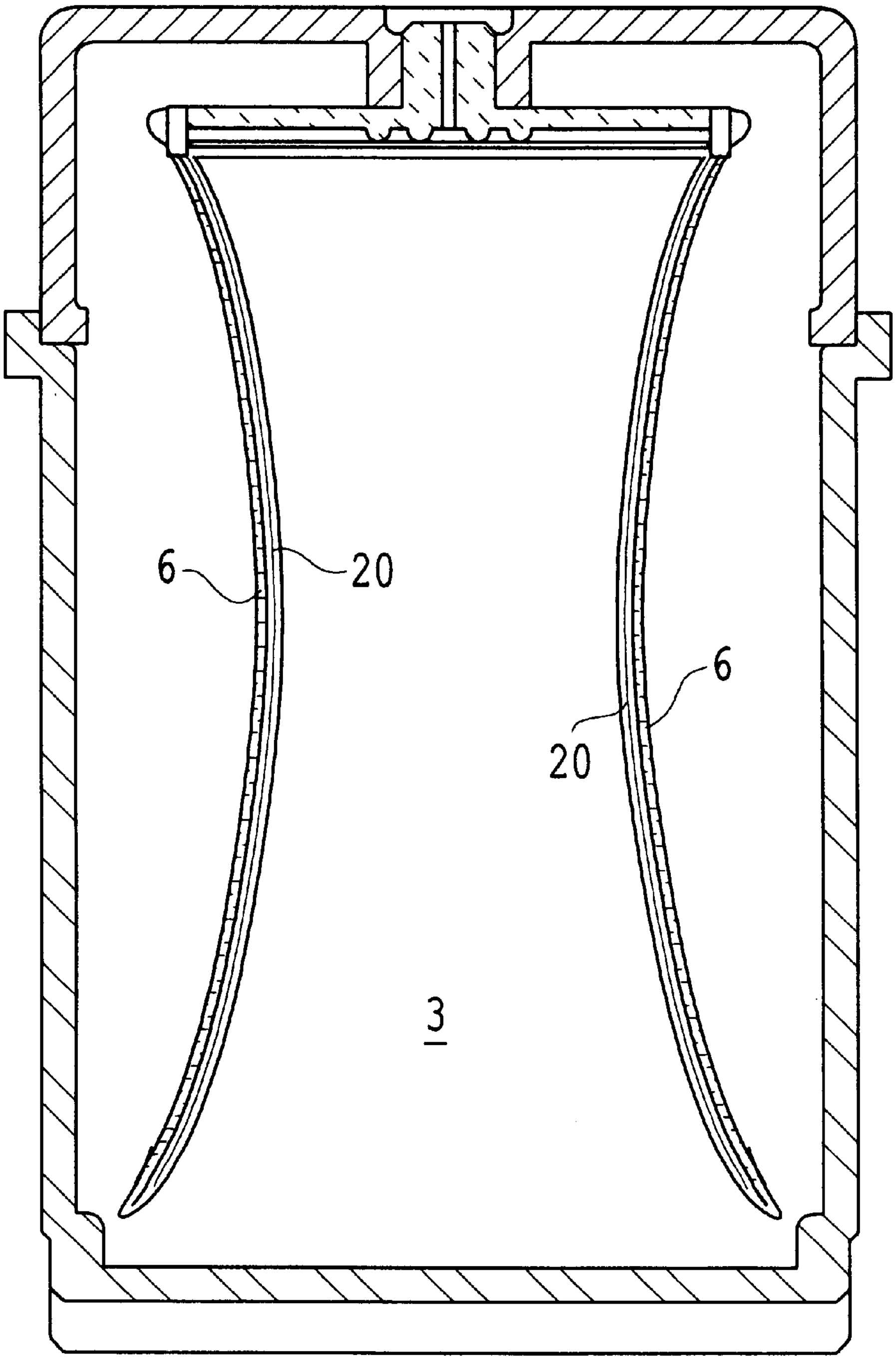
FIG. 1 Prior Art
FIG. 1. A cross-sectional view of the prior art pressure-adjustment means, its combined elastic springs and air bag inside the ink-jet cartridge.
Figure 2:
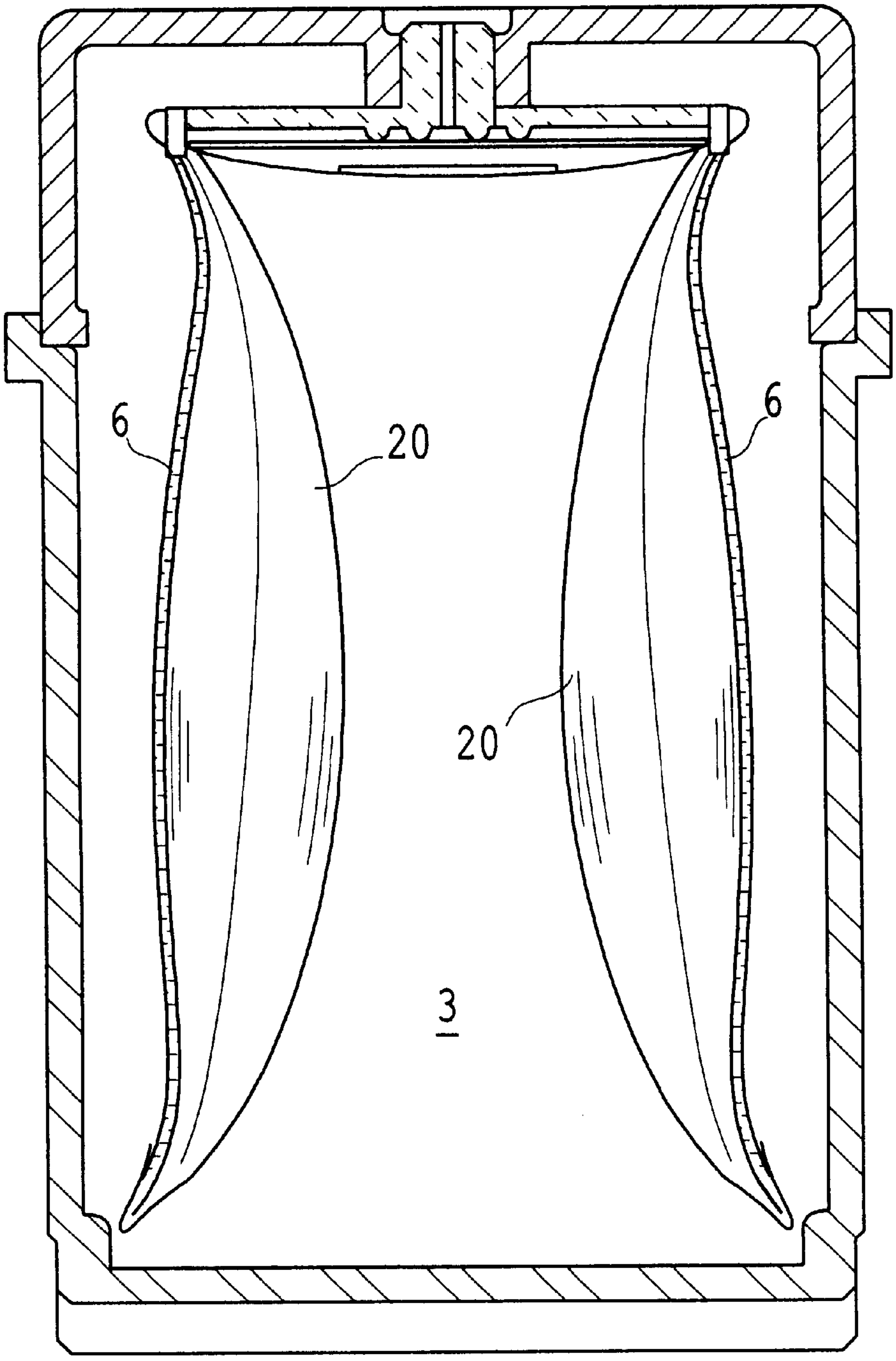
FIG. 2 Prior Art
FIG. 2. A cross-sectional view of the pressure-adjustment means shown in FIG. 1, as its air-bag inflates that deforms the elastic springs.
Figure 3:
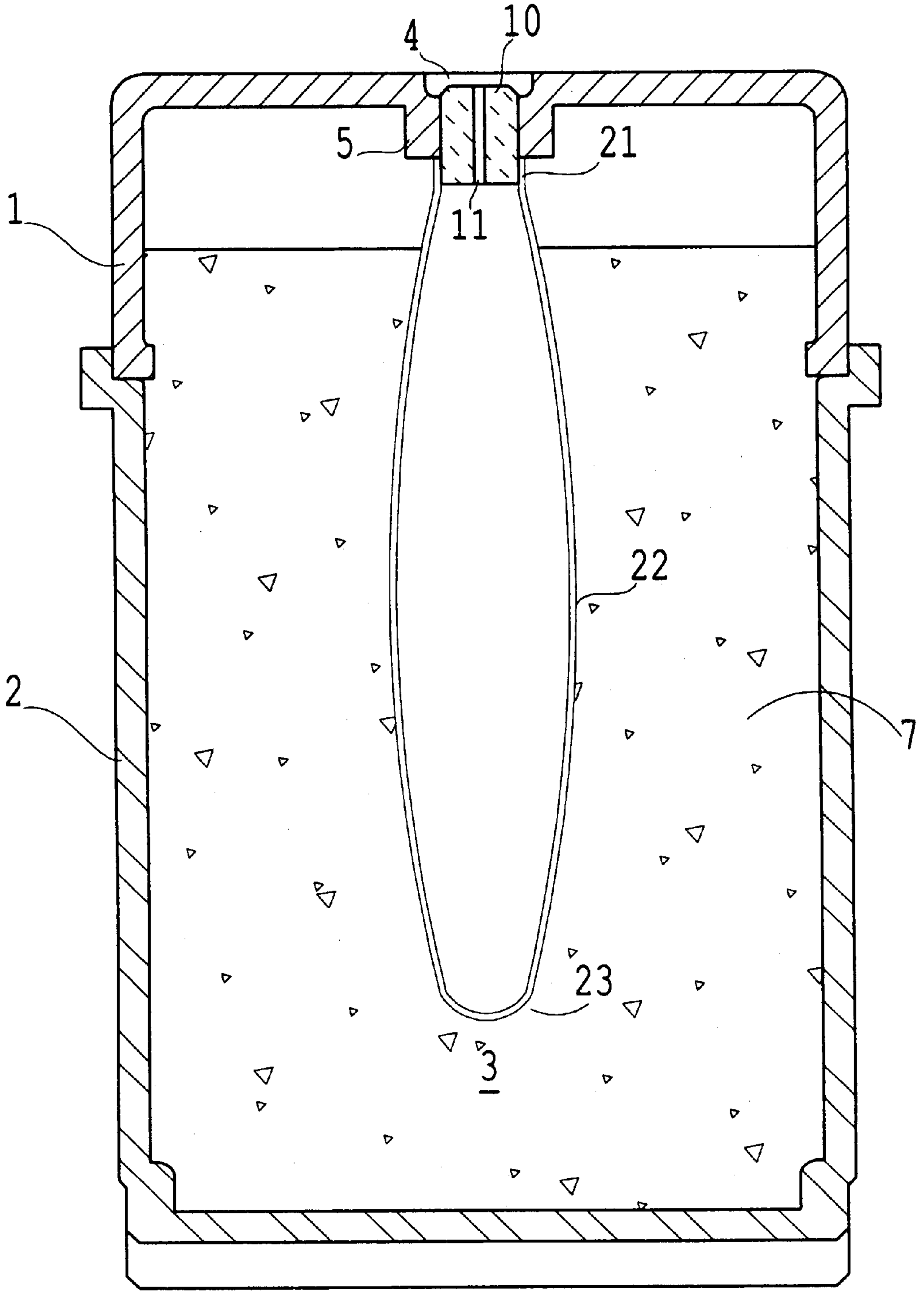
FIG. 3. A cross-sectional view of the ink-jet cartridge of the present invention, wherein the pressure-adjustment means employs an elastic air-bag within the ink-jet cartridge.

First, referring to FIG. 3 for an embodiment of the present invention, the ink-jet cartridge of the present invention comprises a top lid 1 and a cartridge housing 2. When the top lid 1 is fastened onto the cartridge housing 2, the internal space thus formed these between defines the volume of the ink chamber 3 inside the ink-jet cartridge that contains ink 7 therein. The printhead (not shown) installed at the bottom portion of the ink chamber possesses a plurality of open orifices whereby ink within the ink chamber 3 spurts outwards by virtual of the heat-expansion or piezoelectricity methods mentioned previously. As shown in FIG. 3, the pressure-adjustment means of the present invention is situated mostly inside the ink-jet cartridge, wherein one end of the means connects with the top lid 1 while the other end suspends within the ink-jet cartridge. This pressure-adjustment means comprises a connecting body 10 and an elastic air-bag 23, wherein the air-bag 23 comprises a neck portion 21 and an elastic portion 22. The neck portion 21 is tightly secured to the bottom of the connecting body 10. The connecting body 10 has a through hole 11 which enables the process of air ventilation between the air inside the elastic air-bag connected therewith and the external air. The diameter of the through hole is approximately between 1.3 mm and 0.05 mm.

The elastic air-bag 23 functions similar to a inflatable ball. The inside of the elastic air-bag 23 is hollow and expands or contracts in response to the pressure changes, and its respective external surface is in contact with the ink and the internal space of the ink-jet cartridge. This elastic air-bag can be made from high-polymer materials, such as latex, silicon gel or rubber, with a non-linear elastic coefficient and maximum yield strength at between 5600–6400 kg/cm$^2$.

Referring again to FIG. 3, a central opening 4 in the top lid 1 of the ink-jet cartridge receives the connecting body 10 for the pressure-adjustment means of the present invention and enables the connecting body 10 to be tightly fastened to the top lid 1. As the diameter of the through hole 11 is between 1 mm to 3 mm, far smaller than the diameter of the air-bag 23, the ability of the air-bag 23 to make adjustments by inflation/deflation will not be negatively affected by its sensitivity to the influence of the atmospheric pressure. In the normal operating situation, namely, when the ink-jet cartridge is open and installed on the ink-jet printer, if the external conditions change (e.g., rising temperature or atmospheric pressure becoming less than 1 ATM,) so that the back pressure internal to the ink-jet cartridge becomes greater than the atmospheric pressure, the elastic portion 22 of the air-bag 23 will decompress the air-bag 23 in response to the pressure difference and releases the internal air through the through hole 11. The ink level then lowers so that the pressure equilibrium inside the ink-jet cartridge is restored, which prevents ink leakage.

Figure 4:
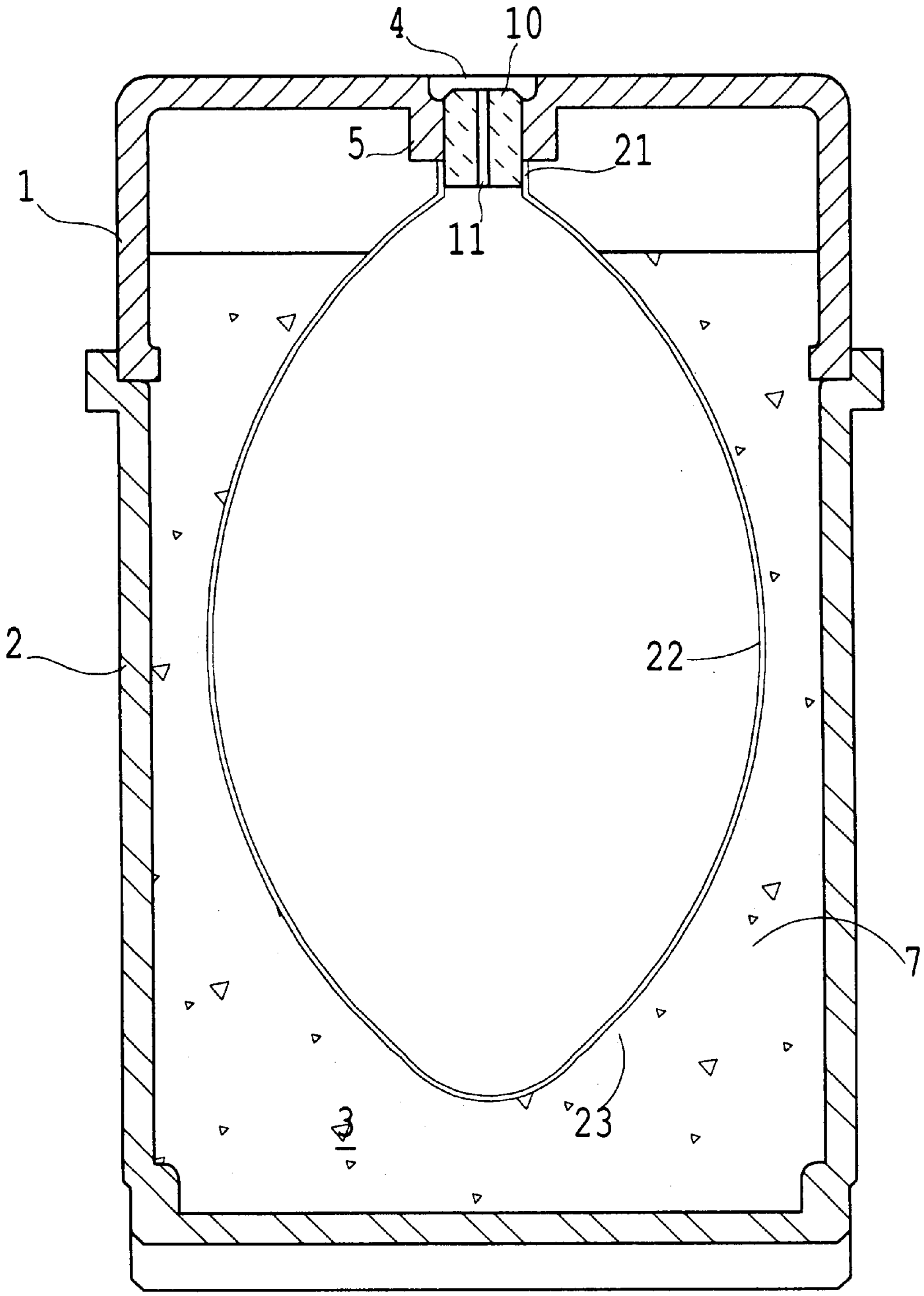
FIG. 4. A cross-sectional view of the pressure-adjustment means disclosed by the present invention, when its elastic air-bag is in the inflation state.

Referring to FIG. 4, in the case where the ink level inside the ink chamber 3 lowers as the printing continues in progress, from the ideal gas law, the increased volume inside the closed ink-jet cartridge will lead to decreased back pressure in the ink chamber 3. Therefore the pressure inside the air-bag 23 (atmospheric pressure) will be greater than the back pressure inside the ink chamber 3, and the elastic portion 22 will inflate and expand as shown. This expanded volume will cause the lowered ink level to rise up so that the original equilibrium state is restored. By virtue of the pressure-adjustment means of the present invention, under any circumstance, the ink-jet cartridge can maintain its pressure in balance so as to ensure smooth ink flow during printing.

Figure 5:
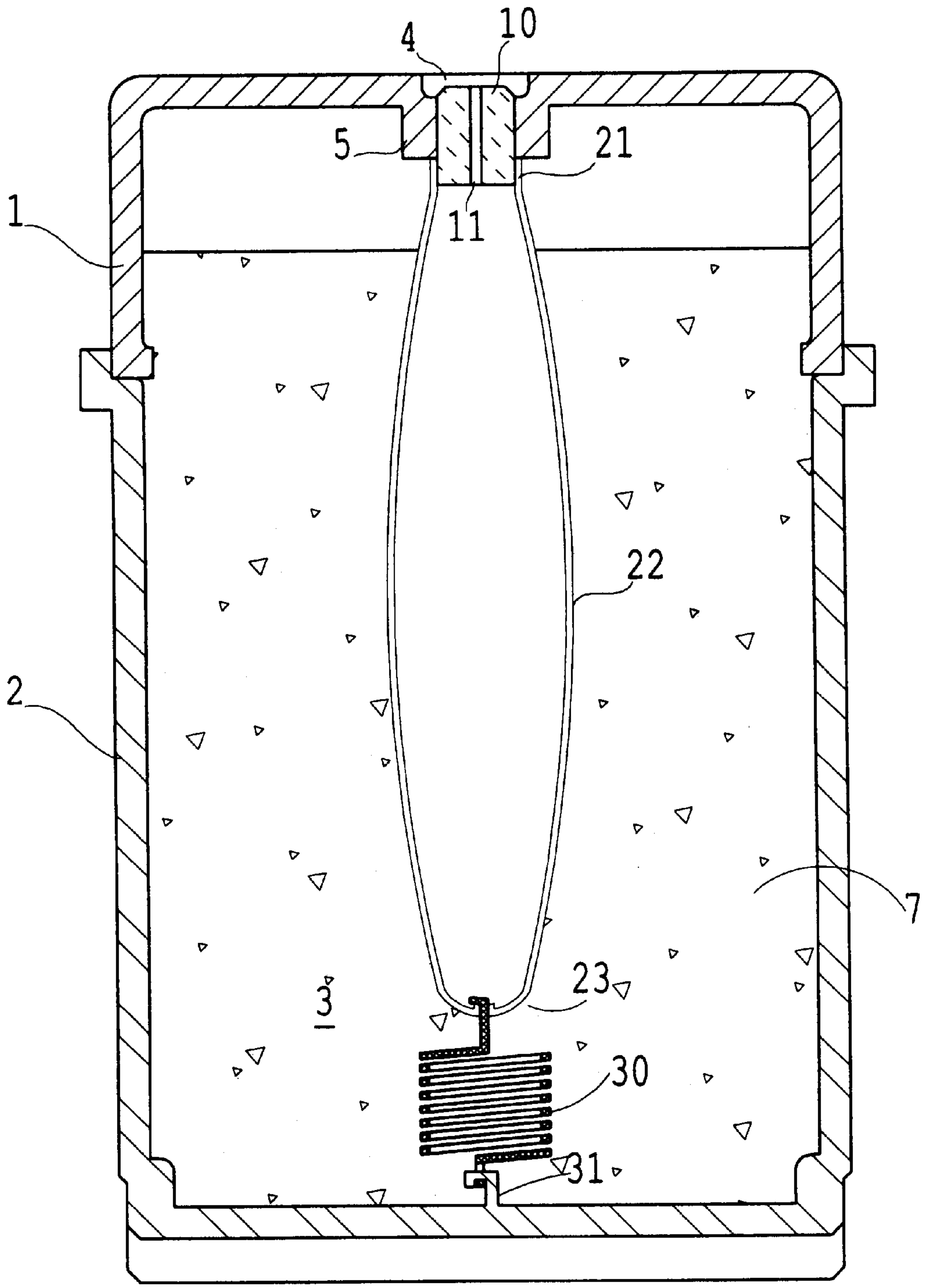
FIG. 5. A cross-sectional view of the pressure-adjustment means disclosed by the present invention in another embodiment.

To further increase the sensitivity of the pressure-adjustment means to the changes in pressure, in another embodiment, an additional spring 30 is installed. In FIG. 5, the constituent elements of this second embodiment are similar to those of first embodiment, with the only difference being an additional spring 30. One end of the spring is hooked to the hook 31 at the bottom of cartridge housing 2, while the other end is fastened to the suspending end of the air-bag 23. The spring 30 creates an elastic force pulling on the air-bag 23, so that when either the external atmospheric pressure or the back pressure internal to the ink chamber 3 undergoes changes, the elastic portion 22 of the air-bag 23 can respond even faster to such pressure changes and expand or contract appropriately. Those skilled in the art will also note that the suspending end of the air-bag 23 can also be fastened to the bottom of the chamber housing 2 directly, so that a reactive force is created which provides the air-bag 23 greater sensitivity when undergoing expansion.

After the elaboration of the preferred embodiments, those skilled in the art should be able to grasp the present invention and without departing from the scope and spirit of the claims, make various modifications. The present invention is not restricted to the preferred embodiment; for example, there is no specification on the shape of the elastic air-bag; any shape which can provide the needed elasticity is acceptable.

What is claimed is:

1. An ink-jet cartridge comprising:

a housing defining a chamber for containing ink, the housing including a top wall and a bottom wall, and a pressure adjustment device for adjusting internal pressure in the ink chamber of the ink-jet cartridge, the device including:

a) a connection body installed in the top wall, the connection body including a ventilation hole formed therethrough;

b) a hook on the bottom wall;

c) an air bag disposed within the housing, the air bag including a top neck portion, an elastic body portion and a closed bottom end;

d) the top neck portion being tightly secured to the connection body for providing communication between the interior of the air bag and the atmosphere; and e) a spring having first and second ends, the first end of the spring being secured to the bottom end of the air bag and the second end of the spring being secured to the hook for applying a pulling force to the bottom end of the air bag.

2. The ink-jet cartridge of claim 1 wherein the air bag is formed of a polymer material.

* * * * *